(12) United States Patent
Gerhard et al.

(10) Patent No.: US 7,719,531 B2
(45) Date of Patent: May 18, 2010

(54) EDITING TEXT WITHIN A THREE-DIMENSIONAL GRAPHIC

(75) Inventors: Lutz Gerhard, Seattle, WA (US);
Christopher D. Dickens, Seattle, WA (US); Craig L. Daw, Bellevue, WA (US); Damien N. Berger, Enumclaw, WA (US); Jason E. Long, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 11/418,760

(22) Filed: May 5, 2006

(65) Prior Publication Data

US 2007/0257904 A1    Nov. 8, 2007

(51) Int. Cl.
*G06T 17/00* (2006.01)
*G06T 15/00* (2006.01)
*G06T 11/00* (2006.01)
*G09G 5/26* (2006.01)
*G09G 5/28* (2006.01)
*G06K 9/36* (2006.01)

(52) U.S. Cl. .................. 345/420; 345/419; 345/467; 345/471; 382/285

(58) Field of Classification Search .......... 345/419, 345/420, 467–472.3; 382/285
See application file for complete search history.

(56) References Cited

U.S. PATENT DOCUMENTS

| 5,805,783 | A | * | 9/1998 | Ellson et al. ............... 345/468 |
| 5,848,425 | A |   | 12/1998 | Lowry et al. ............... 715/205 |
| 6,348,927 | B1 |   | 2/2002 | Lipkin ........................ 345/619 |
| 6,404,435 | B1 | * | 6/2002 | Miller et al. ................ 345/468 |
| 6,473,093 | B1 |   | 10/2002 | Halstead et al. ............ 345/619 |
| 6,512,522 | B1 | * | 1/2003 | Miller et al. ................ 345/474 |
| 6,518,989 | B1 |   | 2/2003 | Ishikawa .................... 715/848 |
| 6,529,206 | B1 | * | 3/2003 | Ohki et al. .................. 345/619 |
| 6,556,195 | B1 | * | 4/2003 | Totsuka et al. ............. 345/419 |
| 6,557,017 | B1 |   | 4/2003 | Venable ...................... 715/210 |
| 6,801,654 | B2 | * | 10/2004 | Nakamura et al. .......... 382/154 |
| 6,803,913 | B1 | * | 10/2004 | Fushiki et al. .............. 345/467 |

(Continued)

FOREIGN PATENT DOCUMENTS

EP    620530 A2 *  10/1994

(Continued)

OTHER PUBLICATIONS

Resch et al., "Drawing in Microsoft Word 2000", Cyberbee Tutorial, pp. 1-7, copyright 2000, http://www.cyberbee.com/word_files/draw.pdf.*

(Continued)

*Primary Examiner*—Ulka Chauhan
*Assistant Examiner*—Roberta Prendergast
(74) *Attorney, Agent, or Firm*—Merchant & Gould, P.C.

(57) ABSTRACT

A two-dimensional text editing mode is used when editing three-dimensional text. Once the three-dimensional text is selected for editing a two-dimensional text editing mode is automatically entered such that the user may easily edit the text. The two dimensional properties that are associated with the text are displayed within an outline of the shape such that the text may be edited in place. The 2-D properties, such as font, text color, shape color, and the like, are maintained during the editing. After the two-dimensional text editing has been completed, the text is redisplayed according to its 3-D properties.

17 Claims, 4 Drawing Sheets

U.S. PATENT DOCUMENTS

| | | | |
|---|---|---|---|
| 6,973,618 B2 * | 12/2005 | Shaughnessy et al. | 715/239 |
| 6,976,214 B1 * | 12/2005 | Bates et al. | 715/236 |
| 7,009,611 B2 * | 3/2006 | Di Lelle | 345/467 |
| 7,237,186 B2 * | 6/2007 | Androski et al. | 715/217 |
| 2002/0154122 A1 * | 10/2002 | Di Lelle | 345/467 |
| 2004/0145603 A1 | 7/2004 | Soares | 715/730 |

FOREIGN PATENT DOCUMENTS

EP  1 008 957  6/2000

OTHER PUBLICATIONS

Slabaugh et al., "A Contour-Based Approach to 3D Text Labeling on Triangulated Surfaces", Fifth International Conference on 3-D Digital Imaging and Modeling, 3DIM 2005, IEEE, Jun. 13-16, 2005, pp. 416-423.*

EP Search Report in Application No. 07794577.2, mailed May 8, 2009; 7 Pgs.

Tory, M.; "*Mental Registration of 2D and 3D Visualizations (An Emperical Study)*"; IEEE Visualization 2003, Oct. 19-24, 2003; Seattle, Washington, USA; 8 Pgs.

Saund, et al.; "*Perceptually-Supported Image Editing of Text and Graphics*"; Palo Alto Research Center, Palo Alto, CA; 10 Pgs., Nov. 2003.

Kinemac; "*3D Real Time Animation System*"; http://www.kinemac.com/support/3dtext.index.html; 2005; 4 Pgs., Feb. 2006.

ArcSoft; "*3D Text Factory*"; http://www.arcsoft.com/products/3dtextfactory/oem.asp; 2006; 2 Pgs., Feb. 28, 2006.

* cited by examiner

EDITING TEXT WITHIN A THREE-DIMENSIONAL GRAPHIC

BACKGROUND

Many applications allow users to create three-dimensional objects that have text associated with them. The text may also have effects applied to it. For example, these effects may be: bevels; extrusions; lighting; three-dimensional rotations and the like. Creating and editing text that is associated with these three-dimensional objects in these applications, however, is usually a very difficult task. For example, the application may treat the text as a three-dimensional shape or may require the user to perform many actions to change or edit the text once the effects are applied to the shape and/or the text. Some applications may not even allow a user to edit the text after effects are applied.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Text associated with three-dimensional effects is edited using a two-dimensional text editing mode. Once the three-dimensional text is selected for editing, a two-dimensional text editing mode is entered such that the user may easily edit and read the text. Instead of having to view the text with its three-dimensional effects applied, the text is displayed two-dimensionally making it easier and more natural to edit. The two dimensional properties that are associated with the text; such as font, text color, shape color, and the like, may also be displayed to the user within the two-dimensional text editing mode. A two-dimensional rendering of the shape that is associated with the text is also displayed to the user such that the text may be edited in place with layout and formatting feedback. After the text editing has been completed using the two-dimensional text editing mode, the text and associated shape are redisplayed according to their three-dimensional properties.

DETAILED DESCRIPTION

Figure 1:
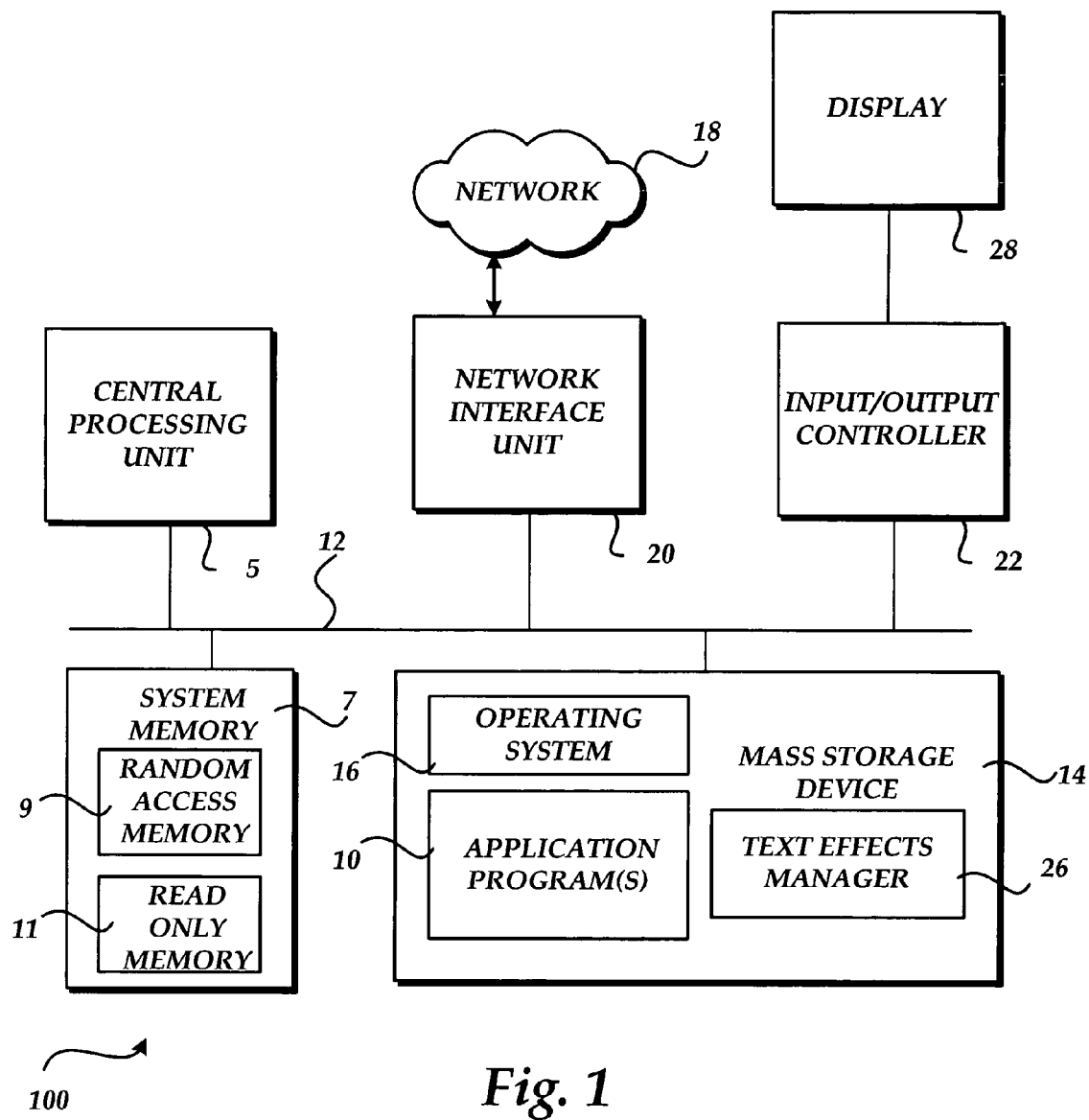
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store one or more application programs 10. The application program(s) 10 is operative to apply three-dimensional (3-D) effects to text. 3D effects can consist of one or more of the following: bevels, extrusions, lighting, materials, orientation, and the like. Different 2D effects may also be applied to the text such as scaling, warping, fill and outline formatting, shadows and the like. Three-dimensional effects may also be applied to a shape on which the text is positioned. Additionally, the three-dimensional effects may be applied to both the shape as well as to the text. According to one embodiment, the application program(s) 10 comprises the MICROSOFT OFFICE suite of application programs from MICROSOFT CORPORATION. For example, application program 10 may be MICROSOFT WORD, POWERPOINT, EXCEL, ACCESS, PUBLISHER, OUTLOOK and the like. Other application programs that implement three-dimensional text effects may also be utilized. For instance, email programs, desktop publishing programs, presentation programs, and any other type of program that allows 3-D effects to be associated with text may be utilized.

The application program 10 may utilize a text effects manager 26. Although text effects manager 26 is shown separately from application program 10, it may be included within application program 10 or at some other location. For example, the text effects manager 26 may be included in a graphics pipeline (See element 220 in FIG. 2), the operating system 16, and the like. As will be described in greater detail below, the text effects manager 26 facilitates the editing of text having three-dimensional properties using a two-dimensional text editing mode. The operation of text effects manager 26 will be described in more detail below.

Figure 2:
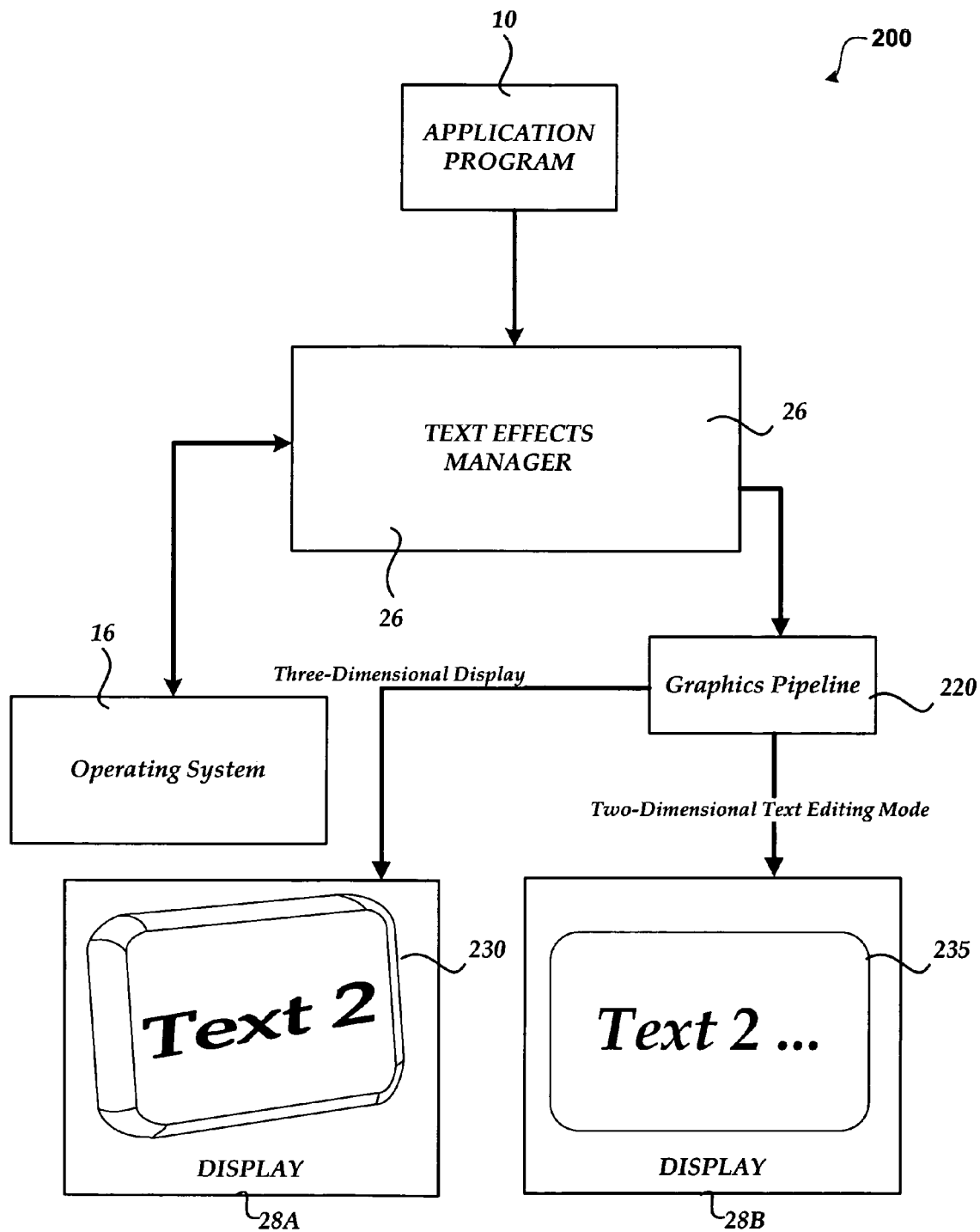
FIG. 2 shows a two-dimensional text editing system for editing three-dimensional text.

FIG. 2 shows a two-dimensional text editing system 200 for editing text having three-dimensional properties. As illustrated, text editing system 200 includes application program 10, text effects manager 26, operating system 16, graphics pipeline 220, and display 28A and 28B.

As described briefly above, the text effects manager 26 uses a two-dimensional text editing mode to edit text that has three-dimensional properties. The text itself may have three-dimensional properties applied directly to it and/or the text may be associated with a three-dimensional object. The two-dimensional editing mode displays the text two-dimensionally. According to one embodiment, in addition to showing the text two-dimensionally, any shape that is associated with the text is displayed two-dimensionally. For example, the text may be located on a three-dimensional cube. In this way, the context of the text and shape are placed into a two-dimensional editing mode. By doing so, the user is able to clearly determine the effects of their edits to the text.

As illustrated in system 200, application program 10 is configured to send information relating to the editing of the text that is displayed within display 28A to text effects manager 26. The information may include the text information for the text run "Text 2" and its associated properties such as the font, shading, color and the like. The information may also include information relating to the three-dimensional shape 230 that is associated with the text. For example, the shape information may include the outline, color, shading, and the like for the shape. Generally, the information includes the information that is used in creating a two-dimensional text editing mode display (See display 28B and FIG. 3) that is used in editing the text that has three-dimensional properties.

In the example illustrated, display 28A shows a default three-dimensional view for the text run "Text 2" that is associated with three-dimensional shape 230. Referring to the three-dimensional shape 230 that is displayed within display 28A it can be seen that the text run "Text 2" is rotated at an angle away from the viewer. Any type of three-dimensional effect, however, may be applied to the text and/or shape. For example, the text may be at such an acute angle that it would be difficult to view the text within a display when it displayed three-dimensionally. In another example, only the text could have three-dimensional effects applied to it. Any text, however, may have three-dimensional effects associated with it. The text may be one or more characters. For example, a text run may be a few characters, a word, a sentence, and the like. Similarly, the text may be associated with any type of shape. For example, the shape may be a cube, a sphere, a trapezoid, and the like.

In this example, the application program 10 has provided text effects manager 26 the text and shape information such that the graphics pipeline 220 may properly render three-dimensional shape 230 and its text run within display 28A.

When a user decides to edit the text that has three-dimensional properties, the text effects manager 26 provides a two-dimensional text editing mode display which shows a two-dimensional representation within the display (e.g. display 28B) such that the user may edit the text. Display 28B displays the text run "Text 2" two-dimensionally within two-dimensional outline 235. The outline 235 is the two-dimensional representation of three-dimensional shape 230. Generally, the determination to edit the text is when a user selects the text on the three-dimensional shape (e.g. shape 230). For example, a user may position a cursor over the text "Text 2" and click a mouse button to position the cursor for text editing.

Instead of having to view the text with its three-dimensional effects applied, the text is displayed two-dimensionally (see display 28B) making it easier for a user to make text edits. The two-dimensional properties that are associated with the text, such as font, text color, shape color, and the like, may also be displayed to the user within the two-dimensional text editing mode. For example, if three-dimensional shape 230 is colored a particular way then the two-dimensional representation within shape 235 may also display the particular coloring scheme. According to one embodiment, the text within two-dimensional shape 235 is updated as the edits to the text are being made. In this way, the user can more easily determine how the edited text will appear on the resulting three-dimensional shape 230. For example, if the user where to add a long string of characters to the text for the shape, then the user would see that the text would not fit within the shape and could therefore correct the problem before committing to the edits. After the text editing has been completed using the two-dimensional text editing mode, the text is redisplayed according to its 3-D properties. According to one embodiment, as soon as the user applies 3-D properties to the text or its associated shape, the shape is automatically displayed three-dimensionally. Other ways may be used to exit the two-dimensional text editing mode. For example, the mode could be exited upon a period of inactivity, a selection outside of the two-dimensional shape 235 and the like. This helps to provide a seamless way in which to exit the two-dimensional text editing mode.

Figure 3:
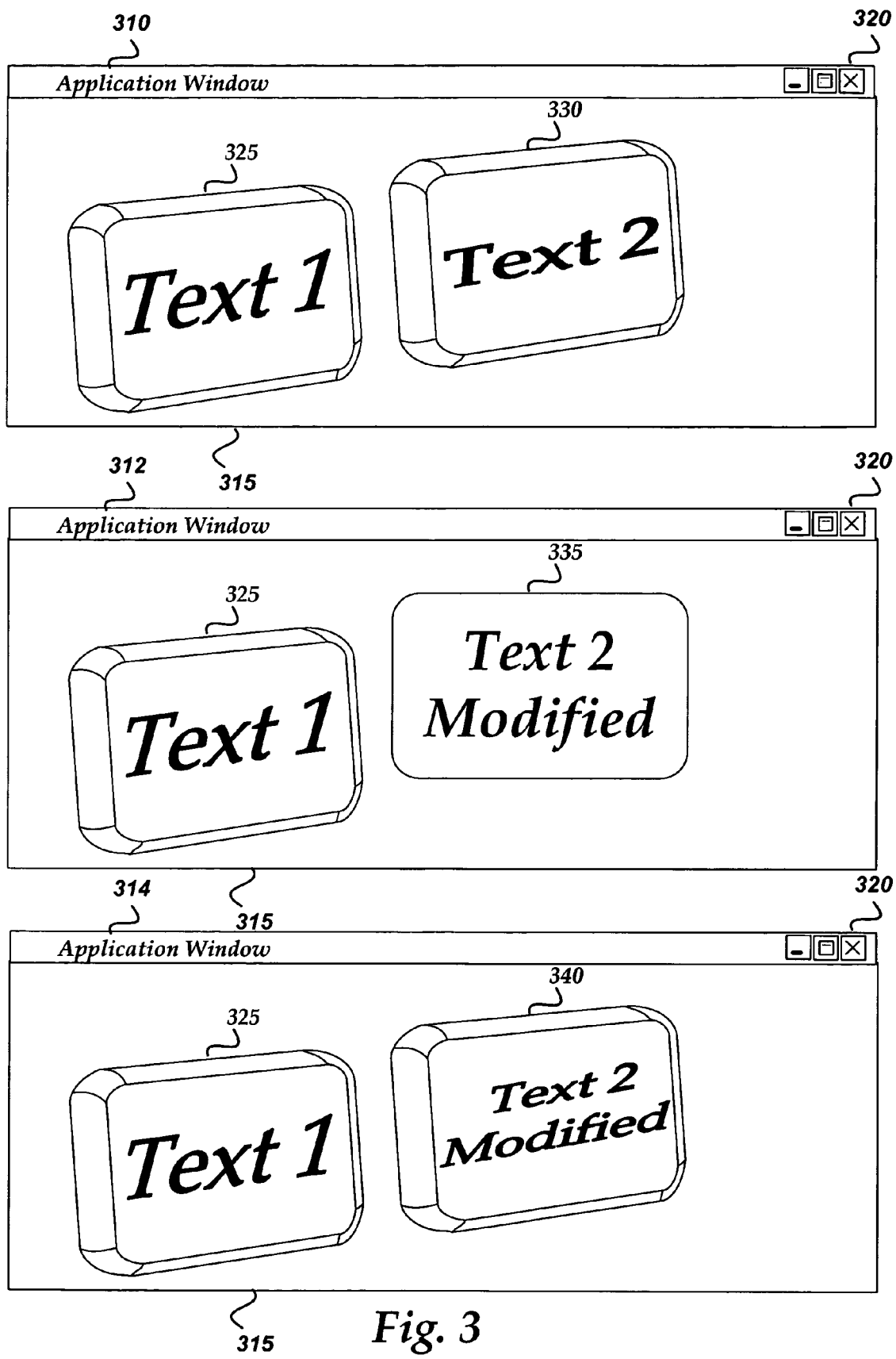
FIG. 3 illustrates an exemplary application window showing editing text within a three-dimensional graphic.

FIG. 3 illustrates an exemplary application window showing editing text within a three-dimensional graphic. As illustrated, FIG. 3 includes application windows 310, 312 and 314, window elements 320, display area 315 and text displays 325, 330, 335 and 340. Application window 310 shows two three-dimensional objects including text having three-dimensional properties. Shape 325 includes the text "Text 1." Shape 330 includes the text "Text 2." For purposes of illustration, and not to be limiting, the text "Text 2" that is associated with shape 330 is selected for editing.

When selected, the three-dimensional shape 330 and associated text is displayed as a two-dimensional shape 335 as illustrated within application window 312. According to one embodiment, any other three-dimensional objects that are located within the display (e.g. shape 325) are still displayed three-dimensionally within the display area 315 even though the shape including the text to be edited is displayed two-dimensionally.

According to one embodiment, the context of the text being edited is maintained while in the two-dimensional editing mode. This is in contrast to many programs that remove all of the properties of the text while it is being edited. According to one embodiment, the contextual properties that are maintained include the font, coloring and shape information. Maintaining the contextual information helps in creating a two-dimensional display which more closely resembles what the final result will look like. As such, the user does not have to enter and exit the text editing mode before checking the final result. The text remains legible during the editing of the text while in the two-dimensional editing mode. As can be seen by referring to shape 335, the text has been modified from "Text 2" to "Text 2 Modified."

Shape 340 illustrates what the text looks like after its three-dimensional properties are restored. The two-dimensional text editing mode may be seamlessly exited. According to one embodiment, as soon as the user applies 3-D properties to the text or the shape containing the text, the shape is automatically placed back into the 3D scene. According to another embodiment, the two-dimensional editing mode is exited when the user selects an area outside of the shape of the currently edited text. For example, when the user selects an area outside of shape 335, the display returns to the three-dimensional display as illustrated within application window 314.

Figure 4:
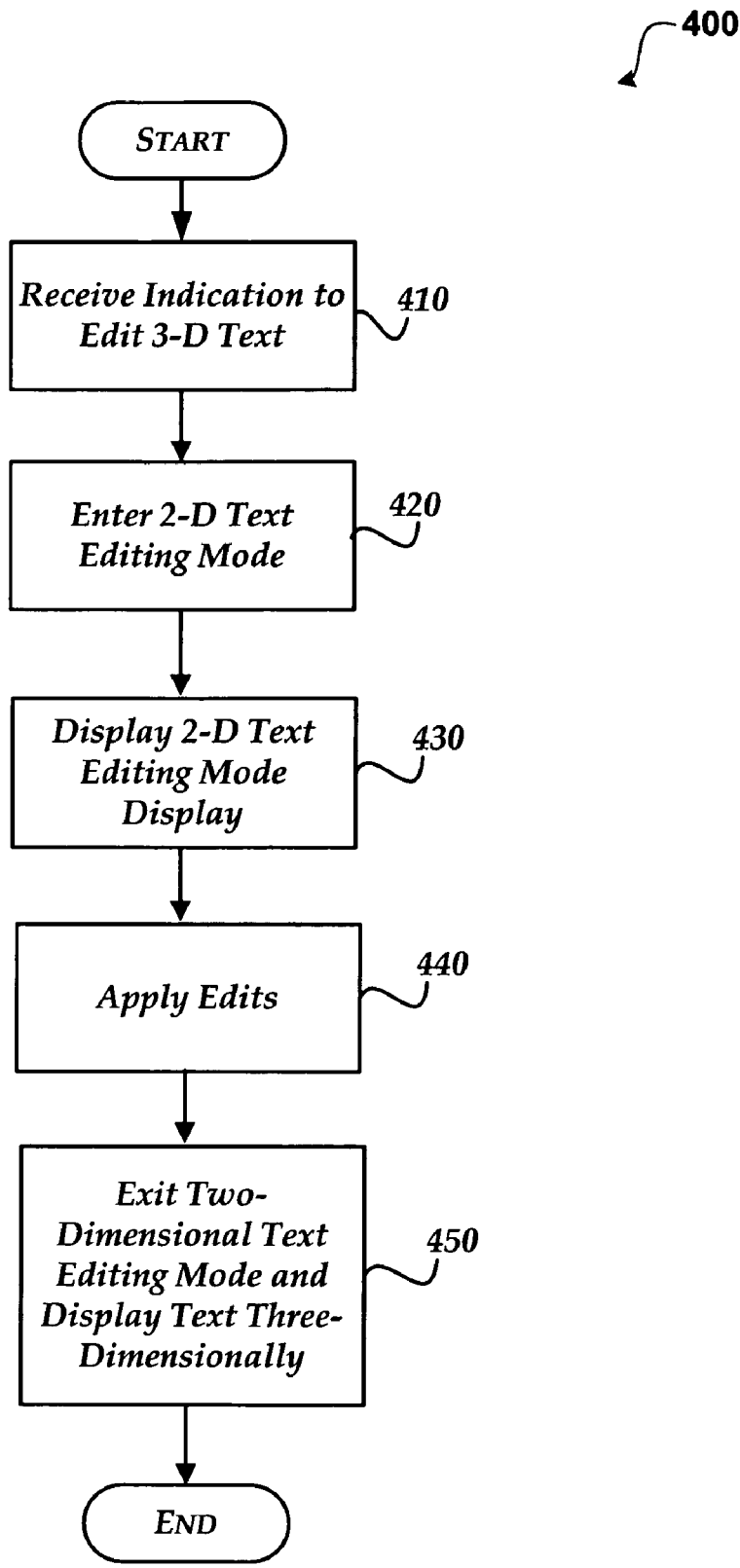
FIG. 4 shows a process for editing three-dimensional text using a two-dimensional text editing mode.

Referring now to FIG. 4, an illustrative process 400 for editing three-dimensional text using a two-dimensional text editing mode will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 410 where an indication is received to edit text. The text that is to be edited has three-dimensional properties that are associated with it. For example, the text may be placed on a three-dimensional graphic and/or the text itself may include three-dimensional effects, such as extrusion, beveling, and the like. The text may be selected many different ways. For example, a user may click on a portion of the text they desire to edit.

Transitioning to operation 420, a two-dimensional text editing mode is entered upon selecting the three-dimensional text to edit. According to one embodiment, the two-dimensional text editing mode is entered automatically without requiring the user to perform other actions to enter the two-dimensional text editing mode. According to one embodiment, the 2D text and/or shape representation is centered about its location in 3D space.

Moving to operation 430, the three-dimensional text is displayed two-dimensionally while edits are being made in the two-dimensional text editing mode. As discussed above, according to one embodiment, the text may is displayed within an outline of the three-dimensional shape that it is associated with. Additionally, any text and shape properties that have corresponding two-dimensional properties may also be utilized as discussed above.

Flowing to operation 440, the user applies any edits to the text they desire. In some cases, the user will not perform any changes to the text, while in other instances the user may make extensive edits to the text.

When the user has finished making their edits, the process flows to operation 450 where the text and shape are displayed according to their three-dimensional properties. As discussed above, the determination of when to exit the two-dimensional text editing mode may be made many different ways.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for editing text that is displayed three-dimensionally, comprising:
    displaying a three-dimensional shape that includes the text that is displayed three-dimensionally; wherein shape information associated with the three-dimensional shape comprises an outline for the three-dimensional shape, a color of the three-dimensional shape and a shading for the three-dimensional shape;
    receiving an indication to edit the text that is displayed three-dimensionally;
    in response to receiving the indication to edit the three-dimensional text: entering a two-dimensional text editing mode; replacing the display of the three-dimensional shape that includes the three-dimensional text and displaying the text two-dimensionally for editing within a two-dimensional outline representation of the three-dimensional shape; uses at least one of: the color of the three-dimensional shape, the shading of the three-dimensional shape when displaying the two-dimensional text, and the outline of the three-dimensional shape
    receiving an edit to the text within the two-dimensional outline representation of the three-dimensional shape and updating the display as edits to the text are made;
    exiting the two-dimensional text editing mode when edits have been completed to the text; and
    displaying the text three-dimensionally.

2. The method of claim 1, wherein entering the two-dimensional text editing mode comprises automatically entering the two-dimensional text editing mode when an indication is received to edit the text that is displayed three-dimensionally.

3. The method of claim 1, further comprising receiving edits to the text and displaying the edits to the text as they occur.

4. The method of claim 1, wherein entering the two-dimensional text editing mode comprises utilizing properties that are associated with the three-dimensional text and the shape to create the two-dimensional display for editing.

5. The method of claim 4, wherein the properties include a font and a color that corresponds to the three-dimensional display.

6. The method of claim 4, wherein exiting the two-dimensional text editing mode comprises determining when a three-dimensional property is applied to the text or the shape containing the text.

7. The method of claim 1, wherein exiting the two-dimensional text editing mode comprises determining when a selection is made outside of the outline.

8. A non-transitory computer-readable storage medium having computer-executable instructions for editing three-dimensional text, the instructions comprising:
   receiving an indication to edit the text that is displayed three-dimensionally; in response to receiving the indication to edit the three-dimensional text: entering a two-dimensional text editing mode; replacing the display of the three-dimensional shape that includes the three-dimensional text and displaying the text two-dimensionally for editing within a two-dimensional outline representation of the three-dimensional shape; wherein the two-dimensional text editing mode uses at least one of: the color of the three-dimensional shape, the shading of the three-dimensional shape when displaying the two-dimensional text, and the outline of the three-dimensional shape;
   receiving any edits to the two-dimensional text within the displayed two-dimensional outline;
   determining when the edits to the two-dimensional text have been completed; and redisplaying the two-dimensional representation of the text three-dimensionally when the edits have been completed.

9. The computer-readable storage medium of claim 8, further comprising determining when the three-dimensional text is selected for editing.

10. The computer-readable storage medium of claim 8, further comprising displaying the edits two-dimensionally as they occur.

11. The computer-readable storage medium of claim 10, wherein displaying the outline and the text two-dimensionally comprises utilizing corresponding two-dimensional properties that are associated with three-dimensional properties that relate to the three-dimensional shape and the three-dimensional text.

12. The computer-readable storage medium of claim 11, wherein determining when the edits have been completed comprises determining when a three-dimensional property is applied.

13. The computer-readable storage medium of claim 10, wherein displaying the three-dimensional representation of the text when the edits have been completed further comprises displaying the three-dimensional shape.

14. A system for editing text that is associated with a three-dimensional shape, comprising:
   a processor and a computer-readable medium;
   an operating environment stored on the computer-readable medium and executing on the processor;
   a display;
   an application operating under the control of the operating environment and operative to include text having three-dimensional properties; and
   a text effects manager that is configured to:
      receiving an indication to edit the text that is displayed three-dimensionally; in response to receiving the indication to edit the three-dimensional text: entering a two-dimensional text editing mode; replacing the display of the three-dimensional shape that includes the three-dimensional text and displaying the text two-dimensionally for editing within a two-dimensional outline representation of the three-dimensional shape; wherein the two-dimensional text editing mode uses at least one of: the color of the three-dimensional shape, the shading of the three-dimensional shape when displaying the two-dimensional text, and the outline of the three-dimensional shape;
      receiving edits to the text within the two-dimensional representation;
      updating the display of the two-dimensional representation as edits to the text are made;
      determining when the edits within the two-dimensional representation have been completed; and
      redisplaying the two-dimensional representation of the text and the three-dimensional shape three-dimensionally when the edits have been completed.

15. The system of claim 14, wherein the application is farther configured to determine when the text contained within the three-dimensional shape is selected for editing.

16. The system of claim 15, wherein the text effects manager is further configured to display the edits to the text within the two-dimensional representation as they occur.

17. The system of claim 16, wherein determining when the edits have been completed comprises determining when an action occurs outside of the two-dimensional representation of the text and the three-dimensional shape.

* * * * *